Patented May 7, 1935

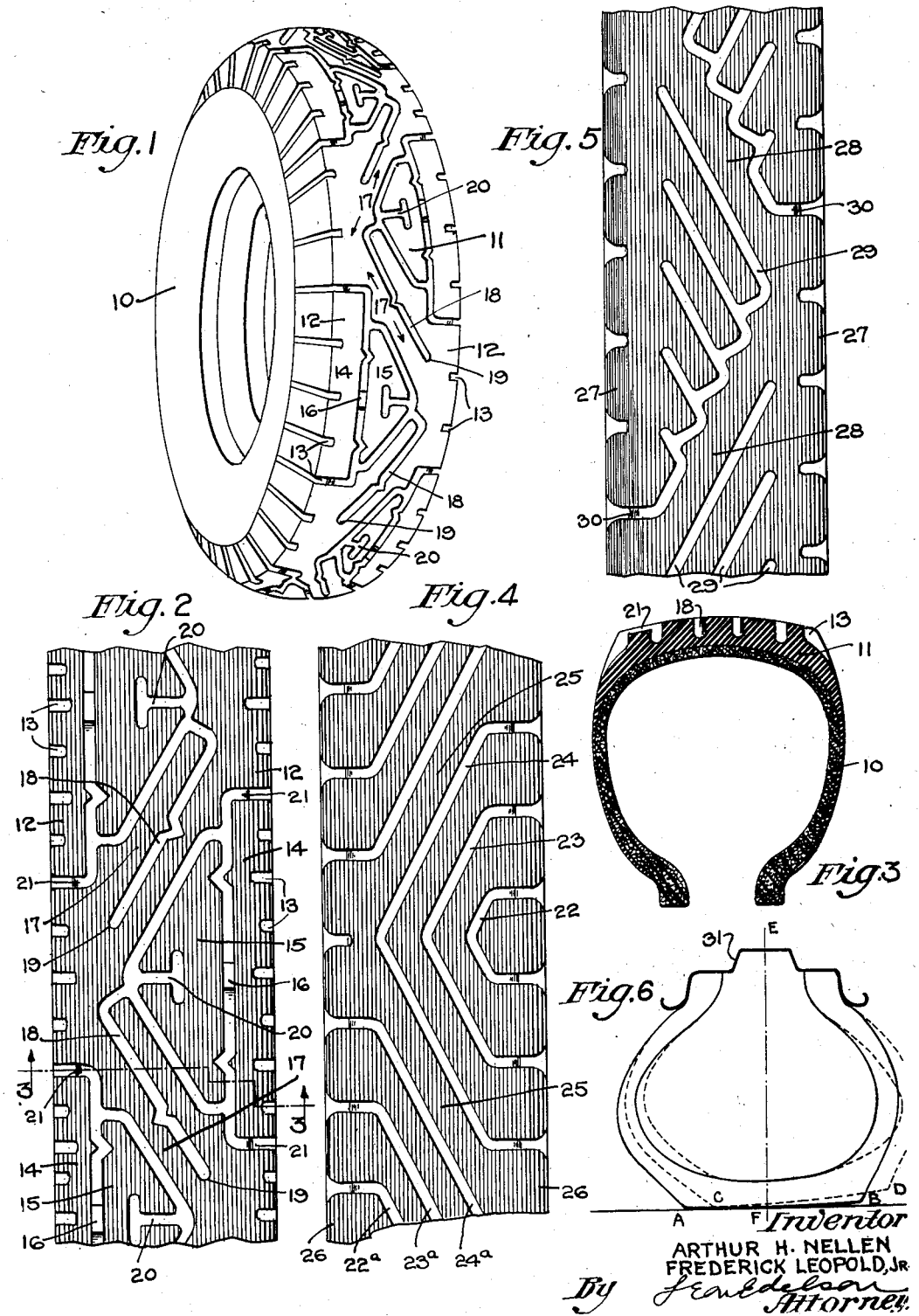

2,000,785

UNITED STATES PATENT OFFICE 2,000,785

VEHICLE TIRE

Arthur H. Nellen and Frederick Leopold, Jr., Harmonville, Pa., assignors to Lee Rubber & Tire Corporation, Conshohocken, Pa., a corporation of New York Application July 14, 1934, Serial No. 735,122

1 Claim. (Cl. 152—14)

This invention relates to automobile tires and more particularly to improvements in the construction and design of the tread thereof.

The present invention has as one of its principal objects to provide an automobile tire the tread of which is so constructed as to prevent any tendency for the tire to slip sideways. This tendency to skid or side-slip is particularly present in vehicles which are equipped with individually sprung front wheels to provide what is commonly known as "knee-action" and wherein "knees" are provided to absorb irregularities in the road surface by permitting the wheels to raise and lower with such irregularities. Experience has demonstrated that when a vehicle equipped with these individually sprung front wheels rounds a curve at a fair speed, the tires are caused to ride over on the sides of their respective treads, this being due to the fact that the weight of the vehicle is thrown to the side away from the direction of the turn, thus making the car lean over to that side at both its front and rear.

Under such circumstances, if the tread edge is not sufficiently rigid to support the weight which is thus thrown upon it, the tire will skid or slip sideways, not only causing an unpleasant squeal or howl but also imparting a decided feeling of instability to the occupants of the vehicle. A similar effect is obtained when the brakes on a vehicle equipped with individually sprung front wheels are applied suddenly because, as the weight is thrown forward upon the front wheels, the knees associated with the front wheels are depressed with the result that the rear end of the car is sprung upwardly and so lightens the weight upon the rear wheels, under which conditions the tendency for the latter to skid or slip sideways is very much increased.

In the usual construction of tires, no particular effort has ever been made prior to the present invention to brace and tie together the opposite circumferentially extending edges of the tire tread. Instead, in most instances these opposite edges of the tire tread were not continuous in their circumferential extent but instead were interrupted at spaced intervals by laterally extending grooves or notches or, if they were continuous in the form of circumferentially extending ribs at opposite edges of the tread, they were not tied together in such manner as to prevent such ribs from rolling over and away from the main body of the tread when for any reason a laterally directed force was applied to the vehicle such as would tend to cause it to skid or slip sideways.

To accomplish the objects of the present invention, the tire tread is so constructed that the opposite edges thereof are tied together by solid rubber struts or ribs which extend laterally across the tread surface in such manner that circumferentially spaced points or zones in one edge of the tread are respectively joined to correspondingly spaced points or zones in the opposite edge of the tread, it being an important characteristic of the tire tread so constructed that the opposite edges or shoulders thereof are substantially continuous throughout their circumferential extents, although the surfaces of said tread shoulders may be grooved or recessed at spaced intervals, as desired, for purposes of design, increasing traction and reducing noise in accordance with recognized practice in the art.

Thus, the tread of the tire as constructed in accordance with the present invention is, in effect, provided with interconnected side edges the rubber bodies of which are each sufficiently massive to withstand the stresses and strains to which they are subject under skid-inducing driving conditions, the connecting struts or ribs serving effectively to prevent either of the tread edges from tending to spread or roll outwardly away from the central or main body of the tread. As a consequence of such construction, not only is skidding prevented to a marked degree but also the durability of the tread, particularly of the side edges thereof, is considerably increased. Also, by the use of the tying-in struts or ribs, the tread body of the tire is rendered more rigid transversely thereof as the result of which the tread body tends constantly to maintain a substantially flat-wise relation to the road when the car equipped with such tires negotiates a curve at fair speed, thus not only reducing very materially the noise induced by the tire but also increasing the feeling of stability of the car as it rounds the curve. It has been observed through testing of many tires that excessive tire noise and instability of the car during negotiation of a curve at fair speed is due primarily to the fact that in the conventional tire the tread body flexes transversely to such extent as to present only one or the other of the tread shoulders to the road, depending upon the direction of the turn, this being avoided by the present invention.

It will be understood, of course, that numerous tread configurations may be developed without departing from the essential principles of the present invention. Accordingly, we have shown in the accompanying drawing several different designs of tread in all of which are embodied the essential feature of the present invention, namely, the provision of laterally extending ties for integrally uniting the opposed tread edges of the tire for the purposes hereinbefore set forth, the invention consisting substantially in the construction and relative arrangement of the tread edges and their interconnecting ribs, all as described more particularly hereinafter, as exemplified in the accompanying illustrations and as finally pointed out in the appended claims.

In the accompanying drawing:—

Figure 1 is a perspective view of a tire constructed in accordance with and embodying the principles of the present invention;

Figure 2 is a planar surface view of a portion of the tread construction of the tire shown in Figure 1;

Figure 3 is a cross sectional view taken on the line 3—3 of Figure 2;

Figures 4 and 5 are surface views of portions of modified tread constructions embodying the present invention; and Figure 6 is a diagrammatic view illustrating the operation of a tire of the present invention as compared with one of conventional construction.

Referring now to the drawing and more particularly to Figures 1 to 3 which illustrate a preferred tread configuration, it will be observed that the tire 10 is of conventional construction, except for the tread body 11 thereof, the latter being the outer part of the tire which is formed entirely of rubber and which acquires its particular shape and configuration by subjecting it to heat and pressure in a suitable mold. This tire tread 11 which is thus formed in accordance with conventional tire manufacturing methods is characterized by the fact that the opposite marginal edges 12—12 thereof, normally termed the tread edges or shoulders, are substantially continuous, i. e., solid throughout their circumferential extents, although the road-engaging surfaces of these opposed tread shoulders 12—12 may be provided with suitably-formed, circumferentially-spaced grooves or recesses 13 therein extending completely or partially across the tread shoulders for purposes of design as well as for the purposes of increasing traction and reducing noise in said shoulders, in accordance with the well-known practice in the art. However, these grooves or recesses 13 which thus extend partially or completely across the tread shoulders, in the tire of the present invention, are relatively shallow as compared to the overall depth of the rubber tread body 11, these grooves or recesses being preferably of a depth not exceeding one-third the overall depth of the rubber body of the tread proper.

In the particular design of the tread as it is illustrated in Figures 1 to 3, inclusive, the tread is grooved or recessed in its surface to provide what may be generally described as a "pine tree" design, each of which is provided with a base 14, a cone 15 and a connecting stem or trunk 16. This design is repeated throughout the circumferential extent of the tire tread, it being observed as shown most clearly in Figures 1 and 2 that the said "pine trees" are arranged in circumferentially spaced, staggered relation, with the bases of successive "pine trees" lying respectively in the opposite shoulders or edges 12—12 of the tread body. In consequence of this relative arrangement, the apices of the cones 15 of successive "pine trees" project in opposite directions laterally of the tread surface, the proximate edges of the successive cones being arranged in substantially parallel relation to define therebetween the diagonally extending ties or struts 17 which serve to interconnect and tie together the opposed shoulders or edges 12—12 of the tread body.

These diagonally extending ties 17, due to the particular configuration and relative arrangement of the "pine trees" shown in Figures 1 and 2, alternately extend in opposite directions and so provide a continuous rib of solid rubber of zig-zag form extending circumferentially about the tread body, the opposed peaks of this zig-zag rib being integrally united to the opposite edges or shoulders 12—12 of the tread body, thus effecting definite ties between the latter at circumferentially spaced points whereby the tread body is rigidified and strengthened for the purposes hereinbefore described.

If desired, the tread design may be augmented, as shown in Figures 1 and 2, by the provision of a diagonal groove 18 disposed centrally between the opposite edges of each diagonal strut 17, one end of each such groove 18 being in communication with the groove defining the cone 15 of the pine tree adjacent the apex thereof, while the opposite end thereof is closed and terminates short of the tread shoulder, as at 19. Also, the cone 15 of each pine tree may be provided with a T-shaped groove 20, the base of which communicates with the apex of the groove outlining the cone 15. These auxiliary grooves 18 and 20 interrupt the solid sections of the tread body sufficiently to increase its traction and reduce the noise or hum of the tire as it travels over the road, it being noted in this connection that all of the grooves forming and associated with each individual "pine tree" configuration are in such communication with each other that any air entrapped in any part of said grooves may be vented through the laterally extending notches 21 defining the opposite extremities of the bases 14 of said "pine trees". To this end, the stem 16 of each "pine tree" is depressed somewhat below the road-engaging surface of the tread body.

It will be understood, of course, that the important feature of the tread construction just described is the provision of the diagonally extending struts or ties 17 interconnecting the opposed side edges or shoulders 12—12 of the tread. This feature is not due solely to the particular "pine tree" configuration of the tread as shown in Figure 1 but is obtainable in other designs as well, such as are illustrated in Figures 4 and 5. In Figure 4, for example, it will be observed that the tread body is provided with circumferentially spaced, laterally staggered sets of nested grooves wherein the grooves 22, 23 and 24 forming one set are arranged reversely to the grooves 22ª, 23ª and 24ª forming the next adjoining set. The grooves of each set are characterized by the fact that their free ends terminate in the side walls of the tread body, thus affording vents for the escape of any air entrapped therein as the tire travels over the road. As in the "pine tree" configuration above described, each set of nested grooves in the modified tread configuration is separated from its adjoining set by a solid rib 25 of rubber extending diagonally between and interconnecting the opposed side edges or shoulders 26—26 of the tread body. As in the former instance, the rib 25 is of circumferentially continuous, zig-zag form with the opposed peaks thereof integrally united to the opposite edges of the tread.

Figure 5 illustrates still another tread configuration wherein the opposed tread edges or shoulders 27—27 are interconnected by diagonal bars 28 of solid rubber and wherein each bar extends in reverse direction with respect to that which immediately precedes or follows it whereby there is again provided a circumferentially continuous, zig-zag form of rib such as that present in the constructions shown in Figures 2 and 4. As in these previously described constructions of the tread body the opposed tread edges or shoulders 27—27 are each substantially continuous throughout their circumferential extents, the road-engaging surfaces thereof being recessed or grooved at spaced intervals, as at 30 to a depth merely sufficient to provide adequate traction and to reduce noise in said edges, as well as to vent any air which may be entrapped within the traction groove or grooves 29 provided in the central part of the tread body, it being noted that the set of grooves 29 formed substantially centrally in the body of the tread, is in free communication at the extremity thereof with one of the grooves 30 formed in the road-engaging surface of the tread shoulder.

In addition to the illustrated tread configuration, others may be developed without departing from the principles of the present invention, the chief desideratum being the provision of struts or ties which definitely interconnect the opposite tread shoulders of the tire to prevent their spreading apart or away from the central body of the tread when the vehicle is negotiating a turn at fair speed. Such struts or ties may be diagonally disposed, as illustrated in the accompanying drawing, so as to provide in effect a continuous rib of zig-zag form, or they may be extended laterally across the tread in other than diagonal directions. Also, they may all be arranged in substantially parallel relation in the form of relatively discontinuous, circumferentially spaced bars with the opposite ends thereof integrally united to the opposed tread shoulders. Or, the cross ties may be arranged in intersecting relation in such manner that each intersecting bar interconnects circumferentially offset points in opposed edges of the tread body.

Figure 6 illustrates diagrammatically the comparative operation of a tire embodying the present invention and one of the conventional constructions, it being understood that by "conventional construction" is meant a tire wherein the opposed tread edges or shoulders are not definitely interconnected by laterally extending ties or struts but instead are free to spread away from the central body of the tread. The tire of the present invention is illustrated in full lines, while the conventional tire is shown in broken lines, from which it will appear that the tread of the former tire lies substantially flat against the road surface whereas the latter tire engages the road surface only at one edge thereof. This difference in action between the two tires under like operating conditions is due to the fact that the interconnecting ties or struts of the present invention prevent such excessive lateral flexing or bending of the tread body as ordinarily causes the tread shoulder disposed toward the inside of the curve to lift upwardly and away from the road surface. In other words, whereas in the conventional tire, one side of the tread surface thereof tends to flex away from the road, in the tire of the present invention substantially the entire width of the tread engages the road surface without being influenced particularly by the inclination of the wheel, the necessary flexing or distortion of the tire as it rounds a curve at fair speed being substantially confined within the side walls thereof. Also, when a perpendicular line E F (see Figure 6) is drawn from the center of the wheel bearing through the tire to the road, the center of the tread of the conventional tire, as shown by the dotted line C D, is farther removed from the point directly under the wheel bearing than the center of the tread of the tire of the present invention, as shown by the solid line A B. Due to this flatwise engagement of the tire tread with the road and the more central position of the tire tread under the wheel bearing, a greater degree of stability is imparted to the vehicle at the same time that the possibility of side-slipping is materially decreased.

It will be understood, of course, that the invention is susceptible of various changes and modifications from time to time without departing from the spirit or general principles thereof and it is accordingly intended to claim the same broadly, as well as specifically, as indicated by the appended claim.

What is claimed as new and useful is:—

In a vehicle tire, in combination, an inner main body, an outer tread body of rubber having substantially circumferentially continuous opposed tread edges or shoulders, and traction-affording bars provided in said tread body for interconnecting the said opposed tread edges or shoulders at circumferentially spaced intervals, said bars being each of a depth sufficient to dispose their road-engaging surfaces substantially in the plane of the road-engaging surfaces of said tread edges, adjacent bars and the portions of the tread edges included therebetween forming spaces within which are provided anti-skid formations.

ARTHUR H. NELLEN.
FREDERICK LEOPOLD, Jr.